C. C. ALDRICH.

Improvement in Bee Hives.

No. 125,427. Patented April 9, 1872.

Witnesses:
A. W. Almqvist
Wm. H. C. Smith

Inventor:
C. C. Aldrich per Munn & Co
Attorneys.

UNITED STATES PATENT OFFICE.

CYRUS C. ALDRICH, OF MORRISTOWN, MINNESOTA.

IMPROVEMENT IN BEE-HIVES.

Specification forming part of Letters Patent No. 125,427, dated April 9, 1872.

*To all whom it may concern:*

Be it known that I, CYRUS C. ALDRICH, of Morristown, in the county of Rice and State of Minnesota, have invented a new and useful Improvement in Bee-Hives; and I do hereby declare that the following is a full, clear, and exact description thereof, which will enable others skilled in the art to make and use the same, reference being had to the accompanying drawing forming part of this specification.

My invention consists in the improvement of bee-hives, as hereinafter fully described and subsequently pointed out in the claims.

Figure 1:
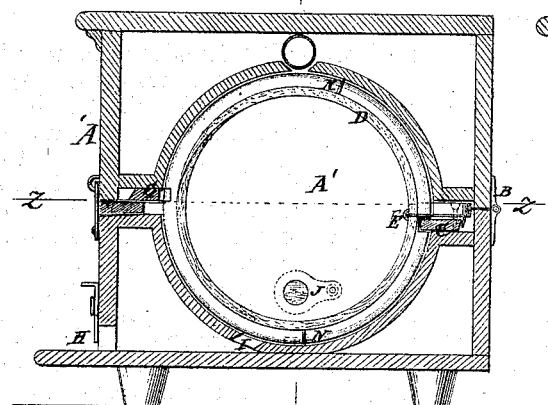
Figure 2:
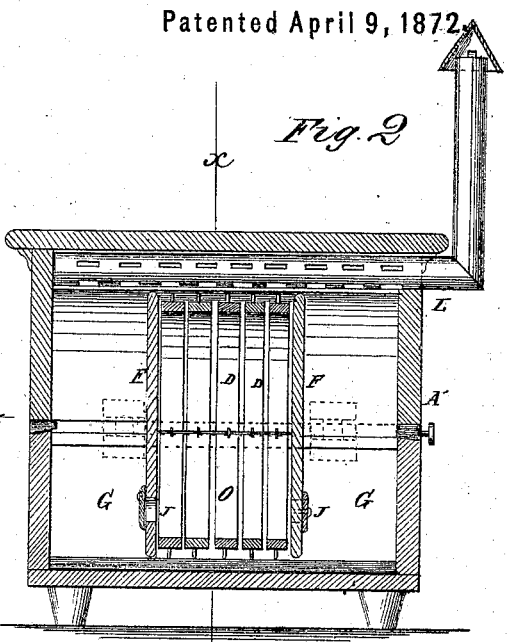
Figure 3:
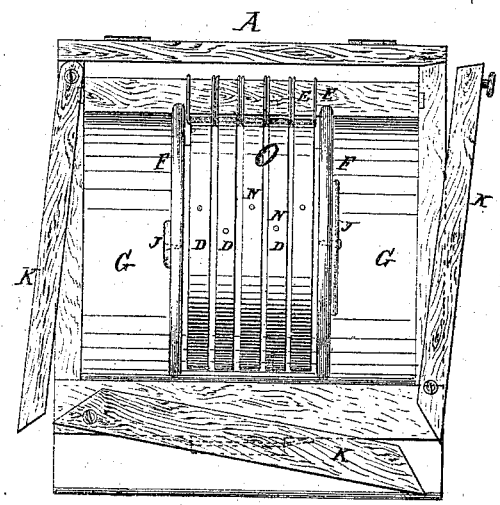

In the accompanying drawing, Figure 1 represents a vertical section of the hive taken on the line $x$ $x$ of Fig. 2. Fig. 2 is a vertical section of Fig. 1 taken on the line $y$ $y$. Fig. 3 is a horizontal section of Fig. 1 taken on the line $z$ $z$.

Similar letters of reference indicate corresponding parts.

A represents the outer walls or casing of the hive, consisting of a box, of cubical form, made in two parts, hinged together near the middle, as seen at B. The interior A' of this cubical box is made cylindrical by filling in the angles. C is a slat in each part of the hive, which projects slightly into the cylinder, to which the honey-frames D are attached by wire hooks E, seen in Fig. 1. F F are partition-plates, the diameter of which corresponds with that of the cylinder. These partitions are notched onto the slats C, to keep them in a vertical position; but the partition, as well as the honey-frames, may be moved laterally in either direction, and adjusted to any desired position in the cylinder. The honey-frames may be supported, by means of the hooks, in either the upper or lower part of the hive. G G are the surplus chambers at the ends of the cylinder. H is the bee-entrance to the hive. I is an orifice between the partitions, through which the bees have access to the honey-frames. J J are orifices through the partitions, provided with side shutters. These orifices give access to the chambers G G. K represents joint-bars pivoted to the edge of the lower part of the hive at one end, as seen in the drawing, Fig. 3. In raising the upper part of the hive these bars are drawn out first, which breaks the propolis or bee-cement and allows the hive to be opened without difficulty. In closing the hive this arrangement prevents the killing of bees, as the bars are replaced after the hive is closed. The brooding-chamber is between the partitions, and marked O. L is the perforated ventilating-tube, placed above but communicating with the cylinder, as seen in Figs. 1 and 2. The tube projects from the hive and from an elbow, with a hood, M, upon its end. The tube may be turned so as to close or partly close the openings, and so as to create more or less draught from the hive. By this means the circulation of air, as well as the temperature of the hive, is regulated. N represents pins in the honey-frames. These frames, it will be seen, are of less diameter than the cylinder, and the pins serve to hold the frames in the proper position.

This form of hive is adapted to the habits of the honey-bee. In their natural state they cluster together in a globular form and lay their brood in this form; and in the cylinder the honey is nearer the brood than it is in a square hive.

By this mode of construction the hive may be opened and access had to the surplus honey, while the brood-chamber is entirely closed and the heat retained. By the sliding shutters and the adjustable ventilating-tube the heat or temperature of the hive is readily controlled both in winter and summer.

Having thus described my invention, I claim as new and desire to secure by Letters Patent—

1. The combination of the bottom-apertured cylinder A', having longitudinal slat at the top, the perforated tube L let into said slat, and the separate ring-frames D, arranged, as described, to provide a circulation of air.

2. A two-part cylinder, A', having an upper notched and lower unnotched slat, C, combined, as described, with notched partition-plates E F, so that said partitions shall be prevented from turning or laterally sagging.

3. The frames D, each provided with hooks diametrically opposite and reversed, in combination with a two-part cylinder, A', having projecting plates C C, so that said frames cannot sag laterally or turn.

4. The combination, with a two-part cylindrical hive, A A', of the jointed bars K, arranged between the said two parts, as and for the purpose specified.

CYRUS C. ALDRICH.

Witnesses:
E. A. BAILEY,
H. BURGESS.